United States Patent [19]

Instone

[11] 4,072,401
[45] Feb. 7, 1978

[54] MOUNTING ARRANGEMENT FOR CASED ELECTRICAL COMPONENTS

[75] Inventor: John C. Instone, Cherry Hill, N.J.

[73] Assignee: SGL Industries, Inc., Haddonfield, N.J.

[21] Appl. No.: 753,354

[22] Filed: Dec. 21, 1976

[51] Int. Cl.² .............................................. H02G 3/10
[52] U.S. Cl. .................................. 339/125 R; 339/134
[58] Field of Search ............... 339/125 R, 133 R, 134; 220/3, 9, 3.92; 248/223.2, 222.4, 224.3, 224.4, 225.1, 225.2

[56] References Cited

U.S. PATENT DOCUMENTS

| | | | |
|---|---|---|---|
| 1,592,990 | 7/1926 | Raquette et al. | 220/3.92 |
| 2,879,912 | 3/1959 | Appleton | 220/3.9 |

FOREIGN PATENT DOCUMENTS 22,043  10/1961  Germany ......................... 339/133 R

*Primary Examiner*—Roy Lake
*Assistant Examiner*—E. F. Desmond
*Attorney, Agent, or Firm*—Cushman, Darby & Cushman

[57] ABSTRACT

A cased electrical component such as an electrical outlet strip includes a case having laterally projecting ears each provided with an aperture. Mounting brackets, adapted to be temporarily attached to a mounting surface, are fixed to the case at locations such that they obstruct the apertures in the ears thereby preventing the case from being permanently mounted to the mounting surface by fasteners passing through the apertures in the ears.

9 Claims, 5 Drawing Figures

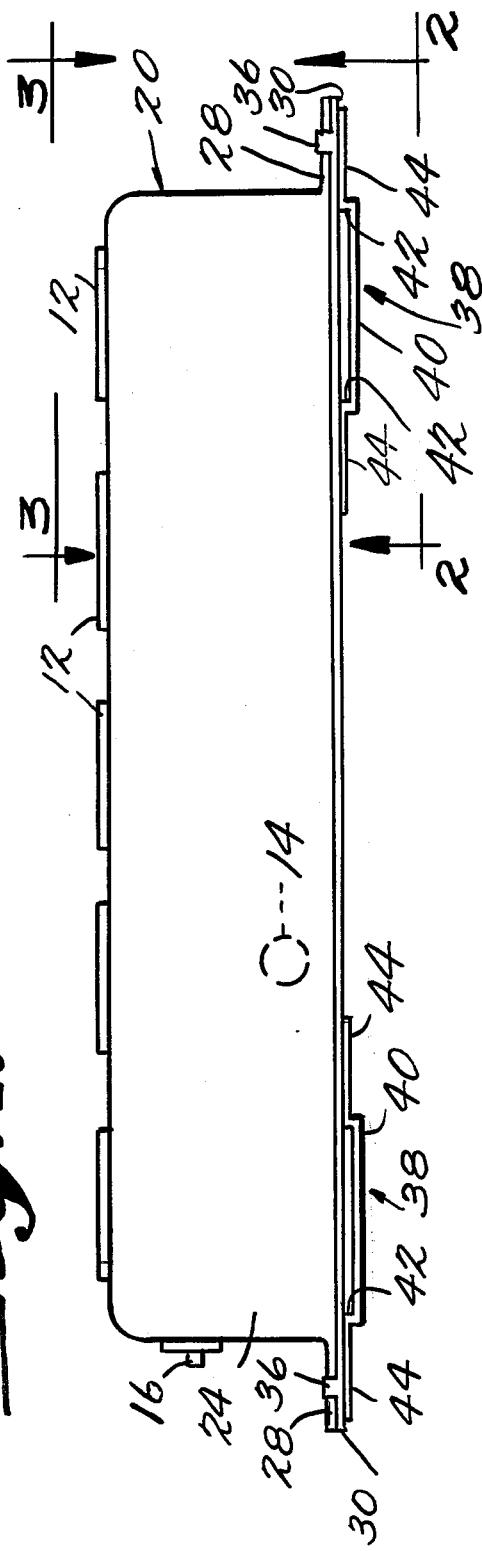
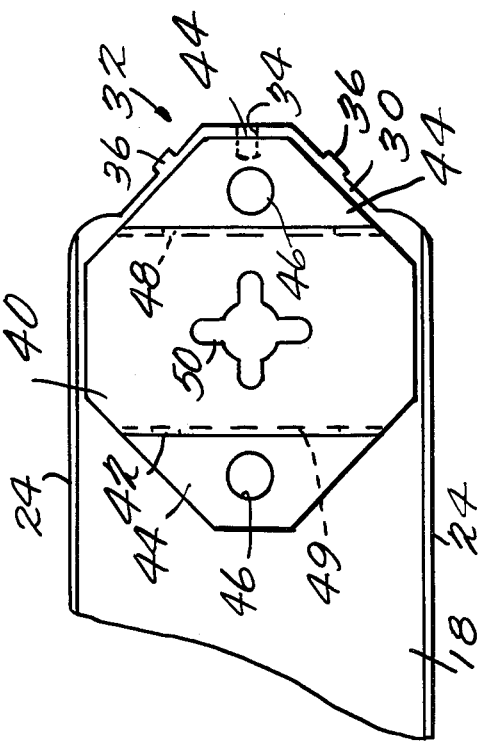

MOUNTING ARRANGEMENT FOR CASED ELECTRICAL COMPONENTS

This invention relates to cased electrical components having special mounting features by which the case may be attached to a mounting surface.

BACKGROUND AND SUMMARY OF THE INVENTION

Cases for electrical components such as outlet strips or panels, certain switches and certain motor controls are typically stamped from sheet metal in the form of a base and a cover which together define a box-like space for receiving the electrical component. Either the base or the cover or both typically include one or more integral ears or tabs, usually lying in the plane of the base, having slots or holes so that the case can be permanently mounted to a mounting surface by fasteners such as screws passing through the slots or holes.

Some environments require that the case of an electrical component be incapable of being permanently mounted to a mounting surface. In this sense permanently mounted means that one or more of the screws or other fasteners which penetrates into the mounting surface must be removed from the surface before the case can be released. In these environments it is permissible and desirable for the case to be non-permanently mounted in the sense that the case can be released from its fasteners or from mounting brackets without first removing the fasteners or brackets from the mounting surface. Inasmuch as such cases may be otherwise identical with the conventional permanently mountable cases there is a need for a modification to a case and/or to the method of manufacture of a case which will permit the manufacture of a single basic form of case which can be easily adapted to either a permanently mountable or non-permanently mountable form. For example, in the manufacture of a conventional permanently mountable case it is conventional to punch out the mounting slots or mounting holes at some point in the production line, usually simultaneously with a pressing operation. It would be inconvenient and costly to change the production line to omit the slots or holes in order to produce a batch of non-permanently mountable cases. Similarly once a production line has been set up to produce non-permanently mountable cases it is not convenient to modify it to produce a batch of conventional cases.

In accordance with one of the principles of the present invention a case for an electrical component is formed in a conventional manner so as to have perforated or slotted mounting ears or tabs and is then provided with permanently affixed mounting means capable of effecting temporary mounting, these means overlying the mounting holes or mounting slots. In this way a single production line may be employed to produce the basic case for either permanent or temporary mounting. The invention also includes the non-permanently mountable case made in this manner.

The invention also contemplates the manufacture of a non-permanently mountable case having no mounting holes or mounting slots but including temporary mounting means and ears or tabs which can be punched to produce permanent mounting holes or slots.

The invention will be further understood from the following more detailed description of an exemplary embodiment, taken with the drawings in which:

FIG. 1 is an elevational view of an electrical outlet strip embodying the principles of the present invention;

FIG. 2 is a fragmentary bottom view taken on the line 2—2 of FIG. 1;

Figure 3:
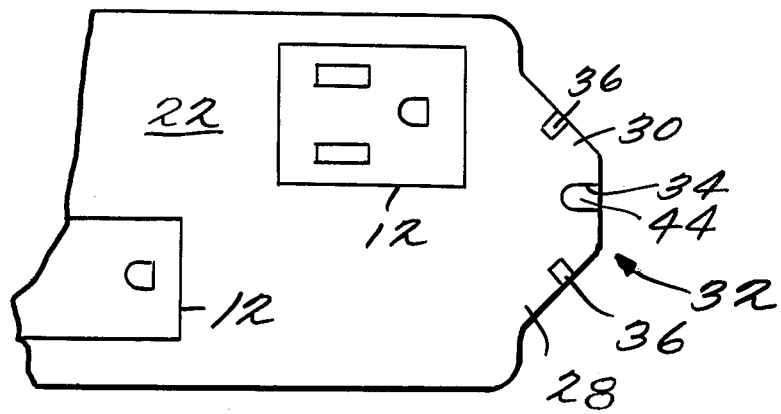
FIG. 3 is a fragmentary plan view taken on the line 3—3 of FIG. 1.

The principles of the invention are illustrated as applied to an electrical outlet strip 10 which may be of conventional construction except for the mounting features. An electrical outlet strip conventionally includes a plurality of electrical outlets 12 which are connected in parallel with current supplied through a lead 14. A circuit breaker (not shown) having a reset button 16 is typically included. The electrical parts are enclosed in a case which typically includes a base having a flat bottom wall 18 and a cover 20 formed with a top wall 22, side walls 24 and end walls 26. The base and cover are conventionally stamped from sheet metal.

At each end of the case there is an integral flange-like projection 28 on the lower end of the cover end wall 26 which overlies a complementary projection 30 on the bottom wall 18 of the base. The two projections 28 and 30 form an ear 32 or tab which is provided with an aperture 34 such as a slot or hole. The base projection 30 includes two integral locking tabs 36 which in the completed case have been bent approximately 180° so as to enage the upper surface of the projection 28 and thereby connect the cover 20 to the base.

All of the above is conventional in the manufacture of cased electrical components of the type which are intended to be permanently mounted to a mounting surface. As described previously a permanent mounting in this art refers to a mounting which once effected can be released only by physical removal of one or more fasteners. The electrical outlet strip 10 described above is adapted for permanent mounting by means of fasteners such as screws (not shown) which pass downwardly through the apertures 34 in the ears 32 into a mounting surface (not shown) so as to clamp the ears 32 to the mounting surface.

According to the principles of the present invention a permanently-mountable, cased electrical component, such as the illustrated outlet strip 10, is modified to a temporary-mountable device in a manner which does not require retooling or other modification of the basic manufacturing technique for the permanently mountable device. To be classed as a temporary mounting the mounting structure must be capable of being released from the mounting surface without removal of a fastener and must be incapable of being permanently mountable. The present invention accomplishes the conversion, after the conventional device has been manufactured, by obstructing the ear apertures 34 and by adding a mounting of the temporary type. Preferably these two objectives are effected simultaneously in a single operation.

As seen in the drawings a mounting of the temporary type is provided in the form of a channel-shaped bracket 38 located on the bottom wall 18 of the base adjacent each of the ears 32. Each bracket includes a web portion 40 which is spaced from the wall 18 by a pair of flanges 42. A triangular foot 44 projects at a right angle from each flange 42 and is fixed to the bottom wall 18 as by a spot weld 46.

Each flange 42 is provided with a slot 48 or 49 located at the junction of the flange 42 with the respective web 40. In addition the web 40 of each bracket 38 is provided with a hole 50 of cruciform shape. The slots 48, the holes 50 and the open ends of the space between the webs 40 and the bottom wall 18 provide temporary mountings as described below.

Figure 4:
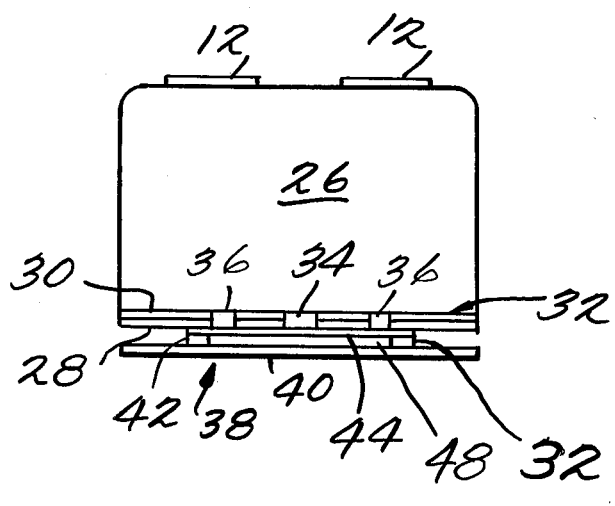
FIG. 4 is an end view of the outlet strip of FIG. 1.
Figure 5:
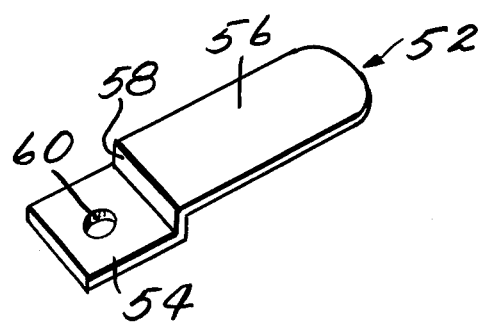
FIG. 5 is a perspective view of a mounting clip for use with the outlet strip of FIGS. 1-4.

FIG. 5 illustrates a mounting clip 52 which when secured to a mounting surface is capable of cooperating with one of the brackets 38 to mount the outlet strip 10 temporarily to the mounting surface. The mounting strip 52, which can be stamped from a single strip of metal, includes a foot portion 54, a parallel offset tongue portion 56 and a connecting portion 58. The foot portion 54 includes one or more apertures 60 for receiving a fastener such as a screw. In its operative position the foot portion 54 is secured to a mounting surface by a fastener in a position such that the tongue portion 56 is spaced from and parallel to the mounting surface. In this position the tongue portion 56 can enter either of the slots 48 or 49 or either end of the channel formed by the web 40 and the flanges 42. Thus, when two clips 52 are mounted at appropriately spaced-apart locations on the mounting surface, the outlet strip 10 can be mounted temporarily to the two tongues 56 by engaging the brackets 38 with the mounting surface and sliding the outlet strip 10 parallel to the mounting surface. This allows any of four different sliding movements to accomplish the mounting of the strip 10, provided that the clips 52 have been first attached to the mounting surface in the desired predetermined positions. For example, longitudinal sliding movement of the strip 10 to the right as viewed in FIGS. 1 and 2 will cause the tongues 56 to enter the slots 48, while sliding movement to the left will cause the tongues 56 to enter the slots 49. Transverse sliding movement of the strip 10, i.e., the right or left as viewed in FIG. 4, will cause the tongues 56 to pass directly into the open ends of the channels defined between the webs 40 and the flanges 42. By selecting the positions of the clips 52 the strip 10 can be easily mounted to the clips 52 even where only limited movement of the strip 10 is permitted by the environment in which the strip 10 is to be used. The cruciform holes 50 in the webs provide yet another mode of effecting a temporary mounting, when the clips 52 are not used. Holes of this configuration, which are adapted to receive the head of a screw embedded in the mounting surface, are of course known per se.

What is claimed is:

1. A cased electrical component wherein the case comprises a base having a generally planar exterior face and a cover which cooperates with the base to define an internal space in which the electrical component is located, said case having at least two integral ears lying generally in the plane of the exterior surface, each of said ears having an aperture therethrough, means adjacent each ear and fixed to said case in a position such that the respective aperture is obstructed; and a mounting bracket of the temporary mounting type attached to said exterior surface adjacent each ear and projecting from said exterior surface in a direction at a right angle thereto.

2. A cased electrical component as in claim 1 wherein each of said mounting brackets is a channel having a web and a pair of parallel flanges, said web lying parallel and spaced from said exterior surface of said base.

3. A cased electrical component as in claim 2 wherein there is a slot in each flange extending parallel to the junction of the respective flange with said web.

4. A cased electrical component as in claim 3 wherein the means obstructing the aperture in each ear is a foot projecting from one of the flanges of the adjacent bracket.

5. A cased electrical component as in claim 4 wherein each web is provided with a hole to receive the head of a screw.

6. A cased electrical outlet strip comprising: a plurality of electrical outlets connected in parallel; a case including a cover overlying said outlets and having a plurality of apertures corresponding in size, shape and location to said outlets and a base underlying said outlets and connected around its periphery to the periphery of said cover, said base having an exterior surface, said case having at least two ears projecting laterally beyond the cover generally in the plane of said exterior surface, each of said ears having an aperture therethrough, a channel-shaped mounting bracket fixed to said exterior surface at a location adjacent each ear, each bracket having a web spaced from and parallel to said exterior surface and a pair of flanges extending at a right angle to said exterior surface, there being a slot in each flange extending parallel to the junction of that flange with the web, each bracket further including a foot projecting from one of said flanges so as to cover the aperture in the adjacent ear, said foot being fixed to said exterior surface; and at least two mounting clips each of which includes two parallel planar portions offset from each other, one of said portions being adapted to be attached to a mounting surface so that the other portion is then spaced from the mounting portion, said other portion being of a size to enter either of said slots and the space between said web and said exterior surface.

7. In a method of manufacturing a case for an electrical component by forming a base and a cover which when connected together define an internal space for the electrical component, said case having at least two ears which project laterally beyond the cover, each of said ears having an aperture therethrough, the improvement which comprises attaching a mounting bracket of the temporary-mounting type of the exterior surface of said base adjacent each ear, said bracket having a portion engaging said exterior surface and overlying and obstructing the aperture of the respective ear.

8. A cased electrical component wherein the case comprises base means having first and second sides, said first side being provided with at least one temporary mounting slot facing outwardly therefrom for receiving the head of a fastener which has been secured to a mounting surface and cover means which cooperates with the second side of said base means to define an internal space in which the electrical component is located, said case having ear means lying generally in the plane of said base means and projecting laterally with respect to the cover means, said ear means being free of permanent mounting apertures passing therethrough.

9. A cased electrical outlet strip comprising: elongated flat base means having first and second sides, said first side being provided with at least one temporary mounting slot facing outwardly therefrom for receiving the head of a fastener which has been secured to a mounting surface; cover means cooperating with the second side of the base means to define an internal space; a plurality of electrical outlets connected in electrical parallel disposed in said space, each of said outlets having a plug-receiving face located in an aperture in the cover, said case having ear means lying in the plane of the base means and projecting outwardly of the cover means at opposite ends of the elongated base means, said ear means being free of permanent mounting apertures passing therethrough, said ear means including means connecting the cover means to the base means.

* * * * *